US012623383B2

(12) United States Patent
Takahashi

(10) Patent No.: US 12,623,383 B2
(45) Date of Patent: May 12, 2026

(54) PLASTICIZING DEVICE

(71) Applicant: SEIKO EPSON CORPORATION, Tokyo (JP)

(72) Inventor: Masayuki Takahashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 100 days.

(21) Appl. No.: 18/589,170

(22) Filed: Feb. 27, 2024

(65) Prior Publication Data

US 2024/0286333 A1 Aug. 29, 2024

(30) Foreign Application Priority Data

Feb. 28, 2023 (JP) ................................. 2023-029313

(51) Int. Cl.
*B29C 45/60* (2006.01)
*B29C 45/47* (2006.01)
*B29C 45/74* (2006.01)

(52) U.S. Cl.
CPC .............. *B29C 45/60* (2013.01); *B29C 45/47* (2013.01); *B29C 45/74* (2013.01)

(58) Field of Classification Search
CPC ......... B29C 45/60; B29C 45/47; B29C 45/74; B29C 45/46
See application file for complete search history.

(56) References Cited

U.S. PATENT DOCUMENTS

| | | | | |
|---|---|---|---|---|
| 11,440,253 B2 * | 9/2022 | Enari | ...................... | B22F 12/50 |
| 12,103,211 B2 * | 10/2024 | Maruyama | ............ | B29C 64/209 |
| 2018/0297258 A1 * | 10/2018 | Zhu | .......................... | B29C 45/78 |
| 2022/0161476 A1 | 5/2022 | Sasagawa | | |
| 2022/0388214 A1 | 12/2022 | Sugita | | |

FOREIGN PATENT DOCUMENTS

| | | |
|---|---|---|
| JP | 2022-083026 A | 6/2022 |
| JP | 2022-187132 A | 12/2022 |

* cited by examiner

*Primary Examiner* — John J DeRusso
*Assistant Examiner* — Shibin Liang
(74) *Attorney, Agent, or Firm* — WORKMAN NYDEGGER

(57) ABSTRACT

A plasticizing device includes a flat screw that has a groove formation surface formed with a groove and is rotated about a rotation axis, a barrel that has a facing surface facing the groove formation surface and is formed with a communication hole, and a heating unit configured to heat a material supplied between the flat screw and the barrel. The barrel has a separate structure including a first member having the facing surface and a second member separated from the facing surface, a space is defined between the first member and the second member, and the heating unit is disposed in the second member.

6 Claims, 16 Drawing Sheets b

PLASTICIZING DEVICE

The present application is based on, and claims priority from JP Application Serial Number 2023-029313, filed Feb. 28, 2023, the disclosure of which is hereby incorporated by reference herein in its entirety.

BACKGROUND

1. Technical Field

The present disclosure relates to a plasticizing device.

2. Related Art

In order to reduce a size of an injection molding machine, a plasticizing device in which a screw in the related art is replaced with a rotor has been proposed. For example, JP-A-2022-83026 discloses a plasticizing device including a screw that has a groove formation surface formed with a groove and a barrel that has a facing surface facing the groove formation surface and is provided with a heater and a communication hole. According to JP-A-2022-83026, the barrel includes a first member and a second member having a thermal conductivity different from that of the first member, and the second member is provided closer to the communication hole than the first member. Accordingly, stabilized plasticization can be achieved by providing a temperature difference between a temperature of the communication hole and a temperature of an outer periphery of the barrel and appropriately controlling a temperature gradient from the outer periphery of the barrel toward the communication hole.

JP-A-2022-83026 is an example of the related art. However, the plasticizing device disclosed in JP-A-2022-83026 needs to be improved. Specifically, when the barrel is formed of members having different thermal conductivities, since thermal expansion coefficients of the members are different, distortion may occur in the barrel under a high-temperature condition.

That is, a plasticizing device having high reliability under a high-temperature condition and stabilized plasticizing performance is required.

SUMMARY

A plasticizing device according to an aspect of the disclosure includes a flat screw that has a groove formation surface formed with a groove and is rotated about a rotation axis, a barrel that has a facing surface facing the groove formation surface and is formed with a communication hole, and a heating unit configured to heat a material supplied between the flat screw and the barrel. The barrel has a separate structure including a first member having the facing surface and a second member separated from the facing surface, a space is defined between the first member and the second member, and the heating unit is disposed in the second member.

BRIEF DESCRIPTION OF THE DRAWINGS

FIG. 7 is a cross-sectional view showing the barrel taken along a line b-b shown in FIG. 4.

FIG. 13 is a cross-sectional view showing the barrel.

DESCRIPTION OF EMBODIMENTS

First Embodiment

Outline of Injection Molding Device

Figure 1:
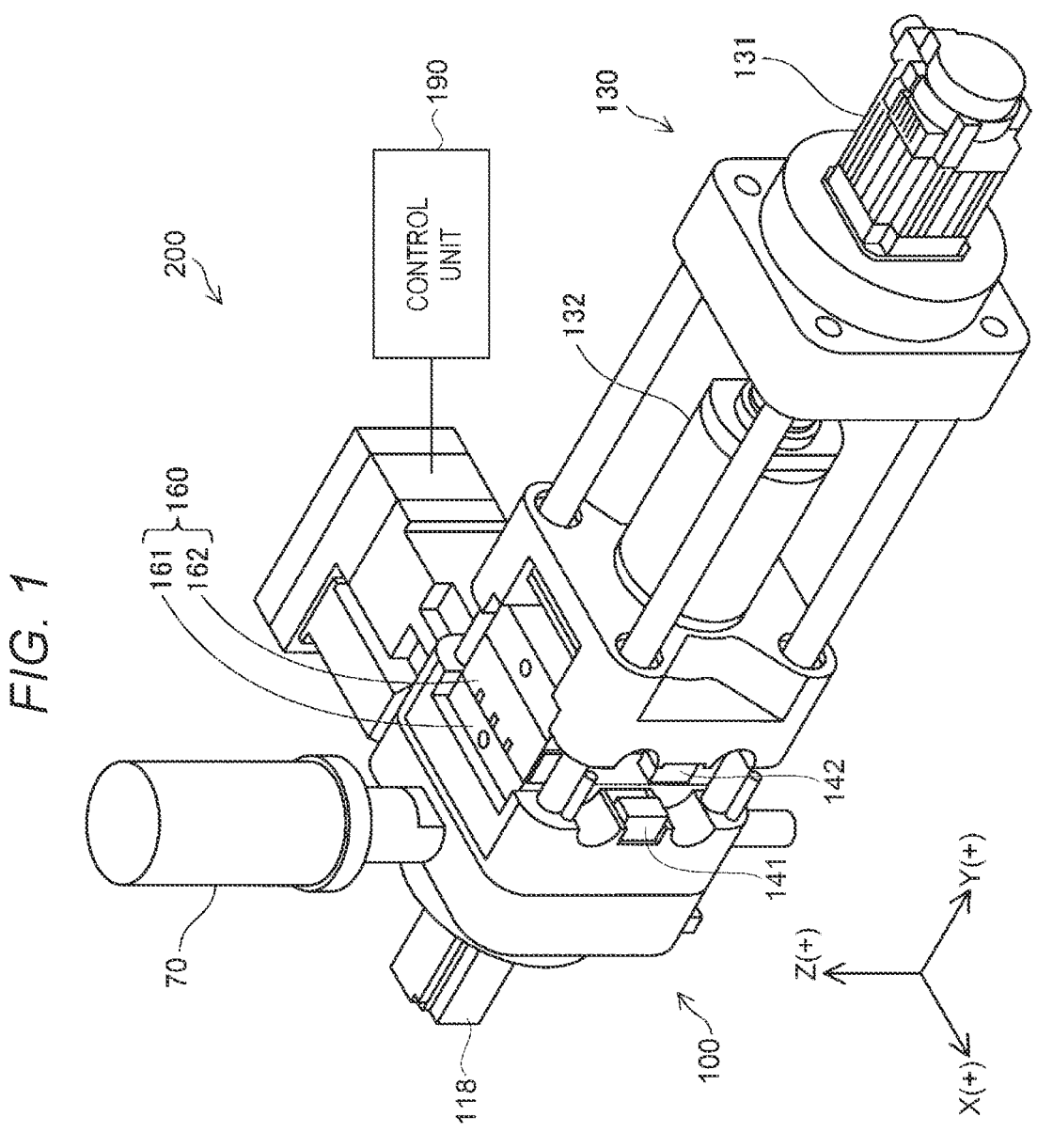
FIG. 1 is a perspective view showing an injection molding device according to a first embodiment.

FIG. 1 is a perspective view showing a schematic configuration of an injection molding device according to a first embodiment.

As shown in FIG. 1, an injection molding device 200 according to the embodiment includes a plasticizing device 100, a mold clamping device 130, a mold 160, and a control unit 190. An X axis, a Y axis, and a Z axis which are three axes orthogonal to one another are shown in the drawings. Specifically, an extending direction of the mold clamping device 130 is a Y positive direction, and an extending direction of a hopper 70 of the plasticizing device 100 is a Z positive direction.

The injection molding device 200 injects a molding material plasticized by the plasticizing device 100 into the mold 160 through a nozzle portion 114 (FIG. 2) to form a molded product.

Operations of the plasticizing device 100 and the mold clamping device 130 are controlled by the control unit 190. The control unit 190 is implemented as a computer including a CPU and a memory, and controls units of the injection molding device 200 by the CPU executing a program stored in the memory. The control unit 190 may be implemented by a circuit. Power from a power supply unit is supplied to the units of the injection molding device 200, and illustration thereof is omitted.

In the embodiment, the metal mold 160 is attached to the mold clamping device 130. The mold 160 is not limited to being made of metal, and may be made of resin or ceramic. The metal mold 160 is also referred to as a mold. The mold 160 includes a fixed mold 161 and a movable mold 162. The fixed mold 161 is fixed to the plasticizing device 100, and the movable mold 162 is fixed to the mold clamping device 130.

The movable mold 162 is movable by the mold clamping device 130 relative to the fixed mold 161 in a mold clamping direction and a mold opening direction. In the embodiment, the mold clamping direction is a Y negative direction, and the mold opening direction is the Y positive direction.

A fixed mold support portion 141 is provided on a Y positive side of the plasticizing device 100. The fixed mold support portion 141 includes a clamp mechanism for fixing the fixed mold 161. The fixed mold support portion 141 is also provided in pair on a surface on an opposite side (an X negative direction) of the fixed mold 161.

A movable mold support portion 142 is provided on a Y negative side of the mold clamping device 130. The movable mold support portion 142 includes a clamp mechanism for fixing the movable mold 162. The movable mold support portion 142 is also provided in pair on a surface on an opposite side (the X negative direction) of the movable mold 162. The fixed mold support portion 141 and the movable mold support portion 142 correspond to a fixing portion.

The mold clamping device 130 has a function of opening and closing the fixed mold 161 and the movable mold 162. Under the control of the control unit 190, the mold clamping device 130 drives a mold drive unit 131 implemented by a motor to rotate a ball screw 132 and move the movable mold 162 coupled to the ball screw 132 relative to the fixed mold 161 to open and close the mold 160.

The plasticizing device 100 is coupled to the hopper 70 into which a material of a molded product is placed. Examples of the material of a molded product include a thermoplastic resin formed in a pellet shape. Examples of the thermoplastic resin include acrylonitrile butadiene styrene (ABS), polycarbonate (PC), polyacetal (POM), polypropylene (PP), and polybutylene terephthalate (PBT). A super engineering plastic represented by polyether ether ketone (PEEK) can also be used. Supply of a material to the plasticizing device 100 is not limited to being performed via the hopper 70, and may be performed via, for example, a tube to which the material is pressure-fed.

Figure 2:
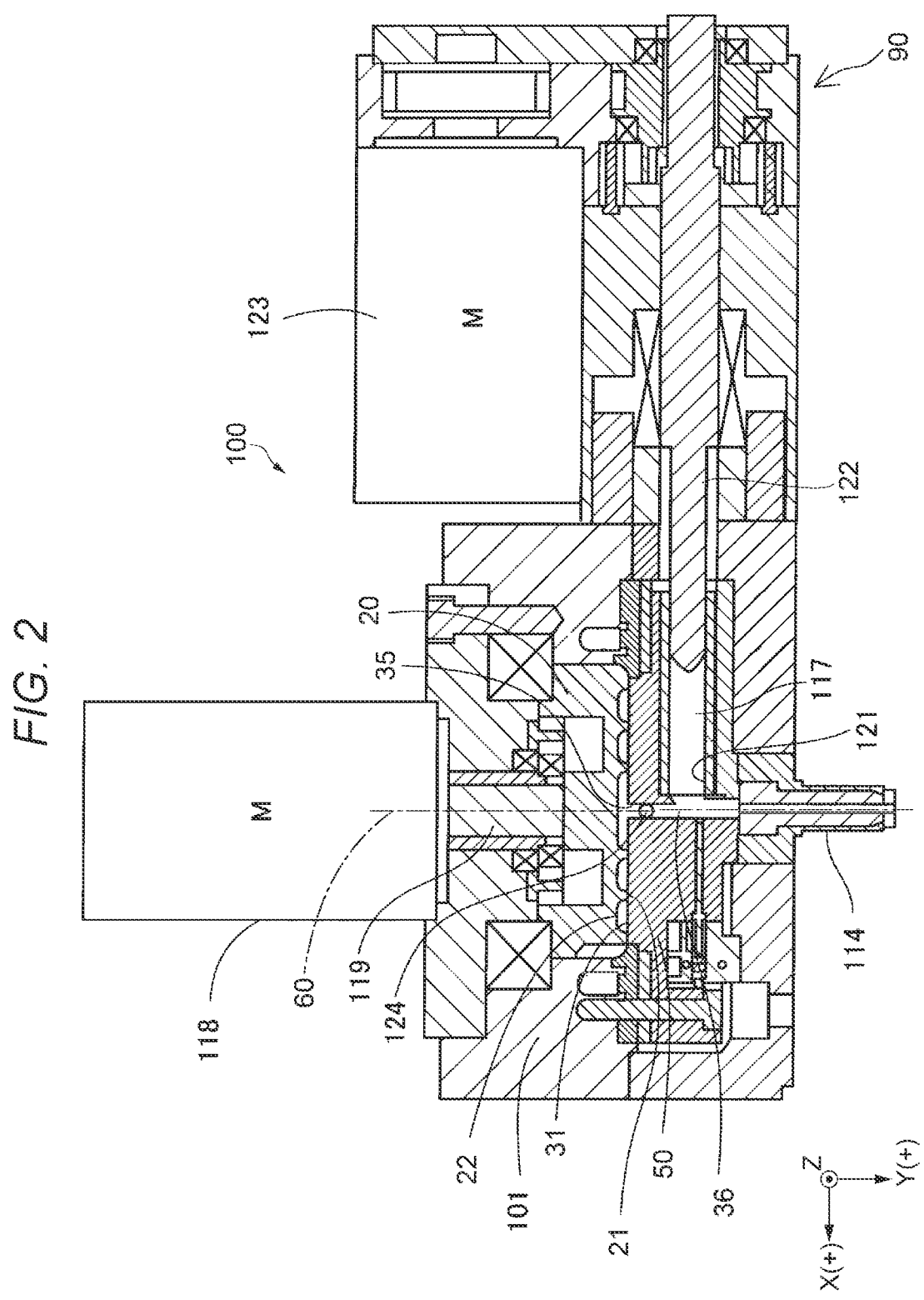
FIG. 2 is a cross-sectional view showing a schematic configuration of a plasticizing device.

The plasticizing device 100 plasticizes at least a part of a material supplied from the hopper 70 to generate a molding material, and injects the molding material into the mold 160 via the nozzle portion 114 (FIG. 2). The molding material is also referred to as a plasticized material. "Plasticize" is a concept including melting, and refers to changing from a solid state to a flowable state. Specifically, for a material in which glass transition occurs, "plasticize" refers to setting a temperature of the material to a temperature equal to or higher than a glass transition point. For a material in which glass transition does not occur, "plasticize" refers to setting a temperature of the material to a temperature equal to or higher than a melting point.

In other words, the injection molding device 200 includes the plasticizing device 100, the nozzle portion 114 that injects the material plasticized by the plasticizing device 100, and the fixed mold support portion 141 and the movable mold support portion 142 that serve as a fixing portion for fixing the mold 160 that receives the material.

Overview of Plasticizing Device

FIG. 2 is a cross-sectional view showing a schematic configuration of a plasticizing device.

The plasticizing device 100 includes a screw 20, a barrel 50, and a suction and delivery unit 90. A device configuration in which the nozzle portion 114 is added to the plasticizing device 100 is also referred to as a material extruding device.

The screw 20 is housed in a housing portion 101. The screw 20 is also referred to as a rotor or a flat screw. The screw 20 is rotated by a drive motor 118 in the housing portion 101 about a drive shaft 119 of the drive motor 118. A line passing through the center of the drive shaft 119 and extending along the Y axis is defined as a center line 60. The center line 60 coincides with a rotation axis of the drive motor 118, and passes through the center of the drive shaft 119 of the drive motor 118 in an XZ plane. Rotation of the screw 20 by the drive motor 118 is controlled by the control unit 190. The screw 20 may be driven by the drive motor 118 via a speed reducer. The housing portion 101 is a case that houses the screw 20 and a part of the barrel 50.

A communication hole 35 is formed at the center of the barrel 50. The communication hole 35 communicates with a flow path 36. A cylinder 121 and the nozzle portion 114 to be described later are coupled to the flow path 36. In the embodiment, centers of the barrel 50, the communication hole 35, the flow path 36, and the nozzle portion 114 coincide with the center line 60.

A spherical check valve 124 is provided upstream of the cylinder 121 in the flow path 36. The check valve 124 prevents backflow of a plasticized material from the nozzle portion 114 side to the screw 20 side.

The suction and delivery unit 90 includes the cylinder 121, a plunger 122, and a plunger drive unit 123. The suction and delivery unit 90 may be omitted.

The cylinder 121 has a branch flow path 117 that is split from the flow path 36 in the X negative direction and serves as a part of the flow path 36. That is, the inside of the cylinder 121 becomes the branch flow path 117.

The suction and delivery unit 90 has a function of injecting the plasticized material in the cylinder 121 into a cavity of the mold 160. The suction and delivery unit 90 controls an injection amount, an injection speed, and injection pressure of a molding material from the nozzle portion 114 under the control of the control unit 190. The cylinder 121 has a substantially cylindrical shape and includes the plunger 122 therein.

The plunger 122 moves inside the cylinder 121 in a direction away from the flow path 36 (the X negative direction) to suction a plasticized material into the branch flow path 117 and measure the plasticized material. At this time, the check valve 124 moves in the Y positive direction and enables a plasticized material to flow into the branch flow path 117 from the communication hole 35.

The plunger 122 moves inside the cylinder 121 in a direction approaching the flow path 36, thereby delivering a plasticized material to the flow path 36. At this time, the check valve 124 moves in the Y negative direction to close the communication hole 35 and prevents backflow of the plasticized material to the screw 20 side.

The plasticized material delivered in such a manner is pressure-fed to the nozzle portion 114. The plunger 122 is driven by the plunger drive unit 123 including a motor. The plasticized material pressure-fed to the nozzle portion 114 is injected from the nozzle portion 114 into the cavity of the mold 160. In other words, the plasticizing device 100 includes the cylinder 121 having the branch flow path 117 split from the communication hole 35 and the suction and delivery unit 90 that includes the plunger 122 reciprocating in the cylinder 121 to suction the plasticized material or deliver the suctioned material to the flow path.

Figure 3:
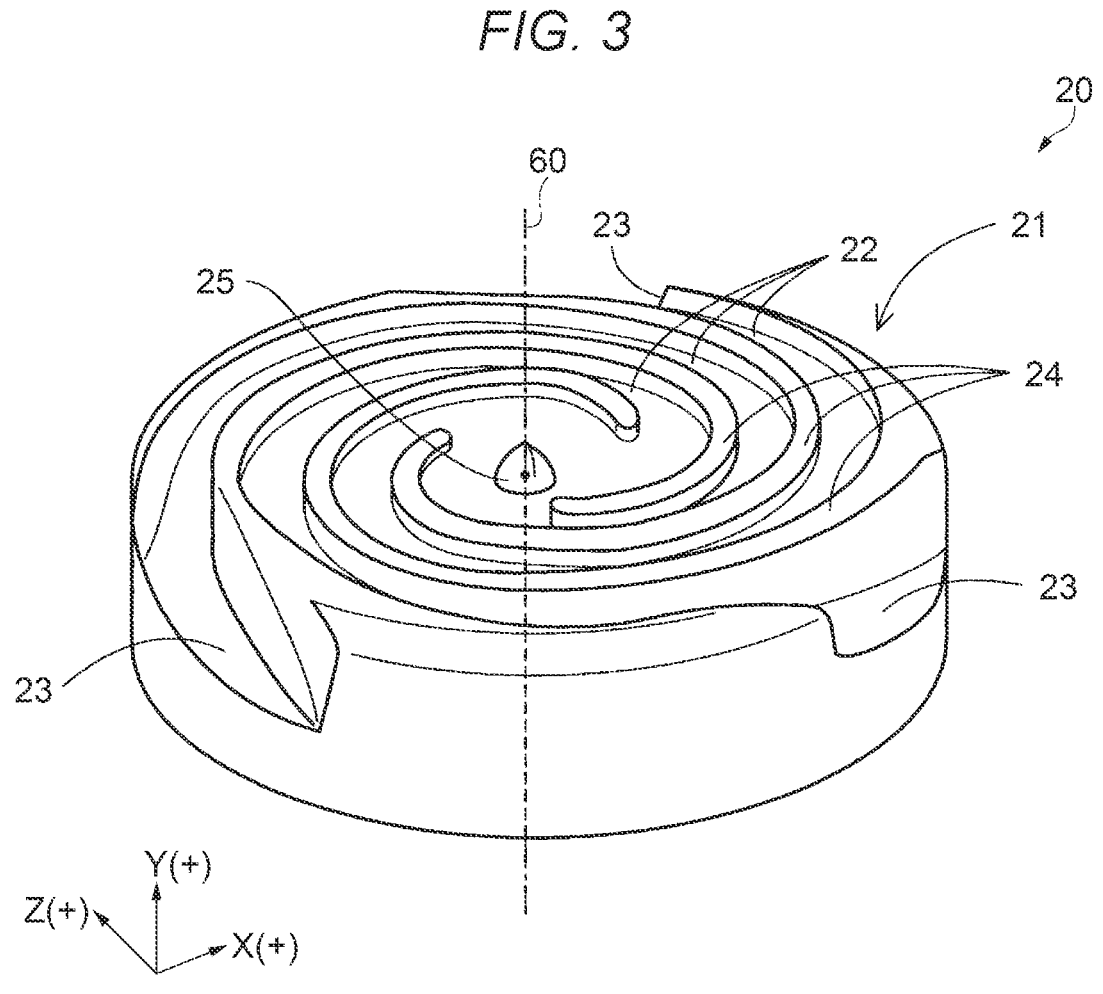
FIG. 3 is a perspective view showing a screw.
Figure 4:
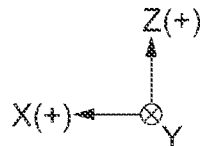
FIG. 4 is a plan view showing a barrel.

FIG. 3 is a perspective view showing a screw. FIG. 4 is a plan view showing a barrel.

As shown in FIG. 3, the screw 20 has a substantially cylindrical shape in which a height in a direction along the center line 60 is smaller than a diameter. Spiral grooves 22 are formed about a central portion 25 in a groove formation surface 21 of the screw 20.

The grooves 22 communicate with material inlets 23 formed in a side surface of the screw 20. A material supplied from the hopper 70 (FIG. 1) is supplied to the grooves 22 through the material inlets 23. The grooves 22 are formed by being separated by ridge portions 24. Although FIG. 3 shows an example in which three grooves 22 are formed, the number of the grooves 22 may be one, two, or four or more. The groove formation surface 21 is a surface facing a facing surface 31 of the barrel 50 shown in FIG. 4.

As shown in FIG. 4, the barrel 50 has the facing surface 31 facing the groove formation surface 21 of the screw 20. FIG. 4 shows a state in which an annular cooling unit 52 is attached around the facing surface 31.

The communication hole 35 communicating with the flow path 36 is formed in the center of the facing surface 31. In a preferred example, a plurality of guide grooves 32 that are coupled to the communication hole 35 and extend spirally from the communication hole 35 toward an outer periphery are formed in the facing surface 31. The guide groove 32 has a function of guiding a plasticized material to the communication hole 35. The guide groove 32 may not be directly coupled to the communication hole 35, and the guide groove 32 may not be formed in the facing surface 31.

Configuration of Barrel

Figure 5:
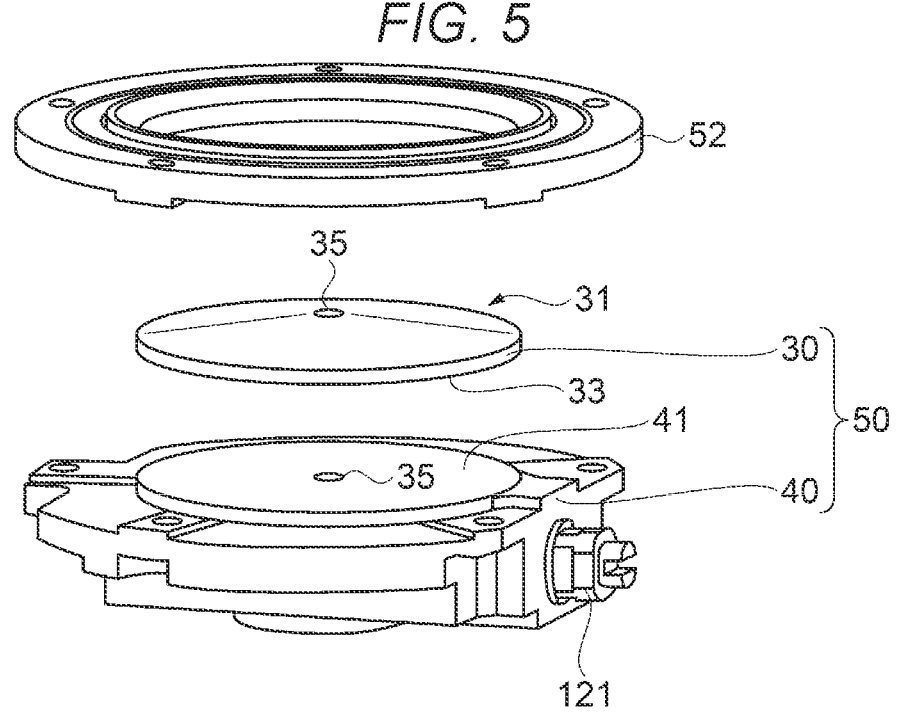
FIG. 5 is an exploded view showing the barrel.
Figure 6:
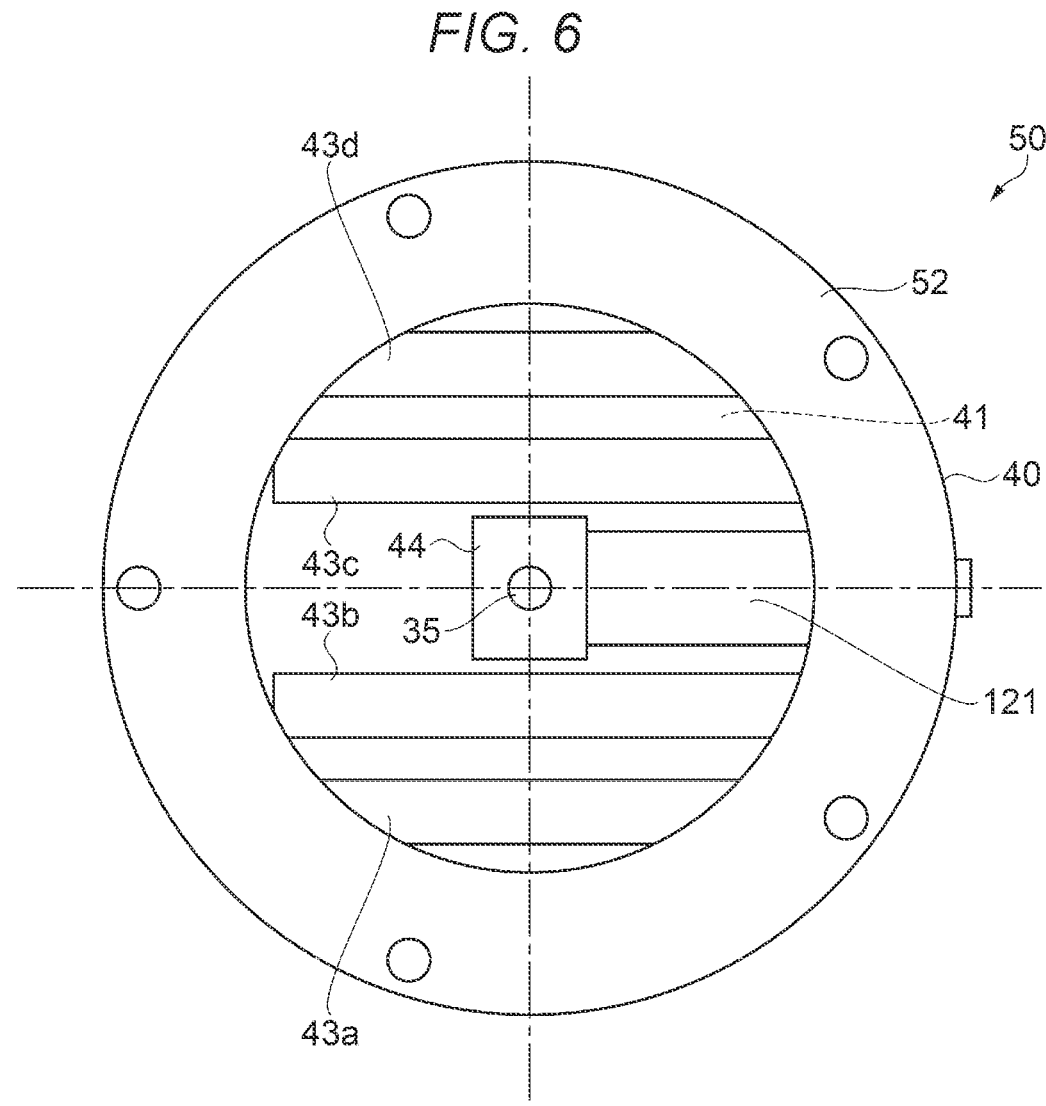
FIG. 6 is a transparent plan view showing the inside of the barrel.
Figure 6:
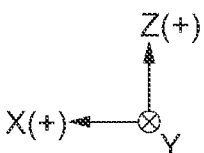
Figure 7:
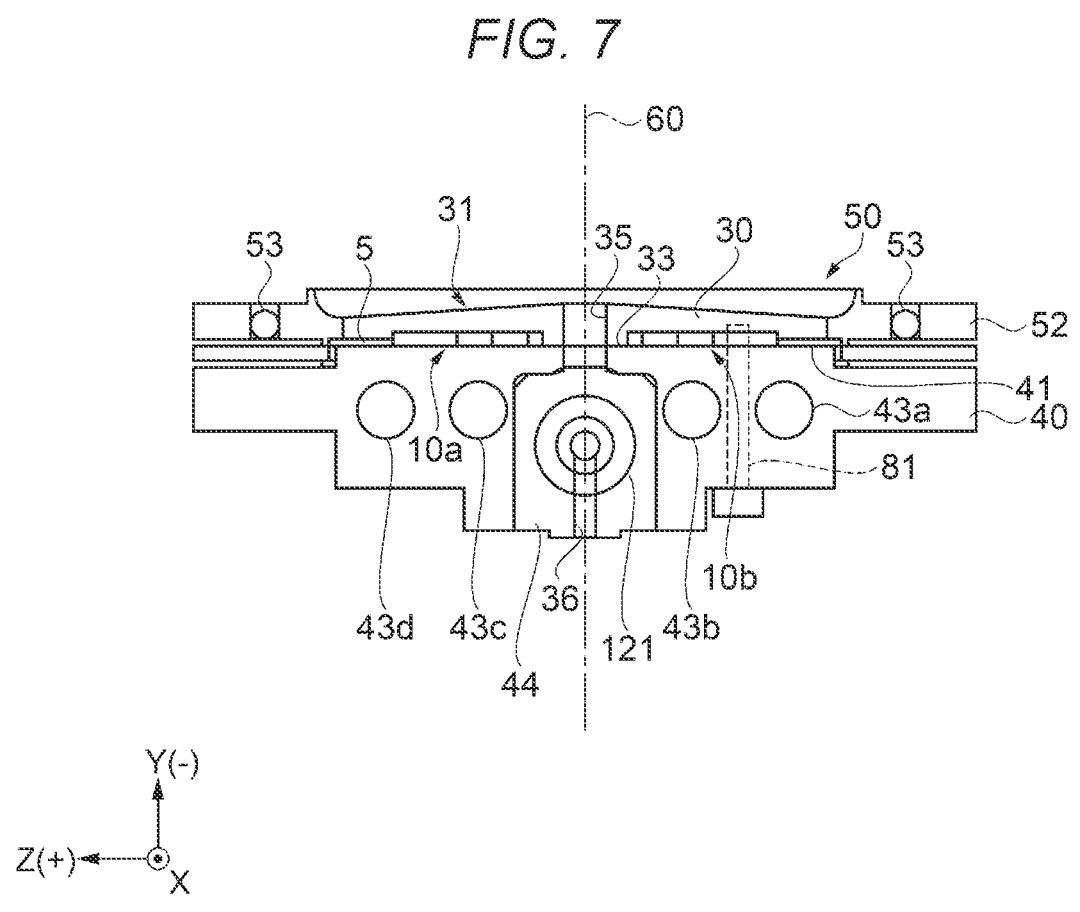

FIG. 5 is an exploded view showing the barrel. FIG. 6 is a transparent plan view showing the inside of the barrel. FIG. 7 is a cross-sectional view showing the barrel taken along a line b-b shown in FIG. 4.

As shown in FIG. 5, the barrel 50 includes a second member 40 that is a base portion, and a first member 30 that has a circular plate shape and is placed on the second member 40.

The first member 30 has the facing surface 31 on a front surface of the first member 30. A back surface of the first member 30 is a flat joint surface 33 to be joined to the second member 40. In FIG. 5, the guide grooves 32 (FIG. 4) of the facing surface 31 are not shown.

The second member 40 is a main body portion of the barrel 50, and a flat placement surface 41 matching a size of the joint surface 33 of the first member 30 is provided on a front surface of the second member 40. The communication hole 35 is formed in the center of the placement surface 41, and when the first member 30 is placed, the communication hole 35 of the first member 30 and the communication hole 35 of the second member 40 communicate with each other. The placement surface 41 of the second member 40 and the facing surface 31 of the first member 30 are separated by a thickness of the first member 30.

In other words, the barrel 50 has a separate structure including the first member 30 having the facing surface 31 and the second member 40 separated from the facing surface 31.

FIG. 6 is a transparent view showing the inside of the second member 40 in a state where the first member 30 is removed. As shown in FIG. 6, the cylinder 121, a tubular portion 44, four rod-shaped heaters 43a, 43b, 43c, 43d, and the like are provided in the second member 40.

The four rod-shaped heaters are heating units, and the rod-shaped heater 43a, the rod-shaped heater 43b, the rod-shaped heater 43c, and the rod-shaped heater 43d are separated from one another and are arranged in a stripe shape in this order from a Z negative direction toward the Z positive direction. The rod-shaped heater 43b and the rod-shaped heater 43c are arranged on both sides of the tubular portion 44, and an extending direction thereof coincides with an extending direction of the cylinder 121. The tubular portion 44 is located at an end of the cylinder 121. In a preferred example, the four rod-shaped heaters 43a, 43b, 43c, and 43d are rod-shaped heating wire heaters having the same thickness. In other words, the heating units are a plurality of the rod-shaped heaters 43a, 43b, 43c, and 43d arranged symmetrically relative to the communication hole 35 along the facing surface 31.

As shown in FIG. 7, the tubular portion 44 is a rectangular tubular member that constitutes a flow path communicating with the flow path 36 from the communication hole 35 via the cylinder 121. Inside the second member 40, the tubular portion 44 is interposed between the rod-shaped heater 43b and the rod-shaped heater 43c.

As shown in FIG. 7, the first member 30 has a convex shape in which a thickness increases from a peripheral edge portion toward the center line 60 at the center of the first member 30. In other words, as viewed from a direction orthogonal to a rotation axis, the first member 30 has a convex shape in which the thickness increases from an outer periphery toward the center.

The cooling unit 52 is an annular member surrounding a periphery of the first member 30, and includes a refrigerant pipe 53 for circulating a cooling liquid therein. The refrigerant pipe 53 is provided in an annular shape surrounding the periphery of the first member 30. The cooling unit 52 is a water jacket that cools the barrel 50. The refrigerant pipe 53 may be formed by a space defined by the cooling unit 52 and the housing portion 101.

The first member 30 and the second member 40 are made of stainless steel in a preferred example. Alternatively, the first member 30 and the second member 40 may be made of aluminum. The same applies to a material of the cooling unit 52.

As shown in FIG. 7, the joint surface 33 of the first member 30 is provided with gap portions 10a and 10b serving as spaces. The gap portions 10a and 10b are recessed portions recessed from the joint surface 33. Since the gap portions 10a and 10b are filled with air, an air layer is defined between the first member 30 and the second member 40 in a preferred example.

In other words, the gap portions 10a and 10b serving as spaces are provided between the first member 30 and the second member 40, and the rod-shaped heaters 43a, 43b, 43c, and 43d serving as heating units are disposed in the second member 40. The gap portions 10a and 10b may be provided in the second member 40 or may be provided in both the first member 30 and the second member 40. When the gap portions 10a and 10b are provided in both the first member 30 and the second member 40, the gap portions 10a and 10b may be formed by recessed portions formed in the first member 30 and recessed portions formed in the second member 40.

As shown in FIG. 7, the first member 30 is fixed to the second member 40 by screws 81. The screws 81 are screwed to the joint surface 33 of the first member 30 from a back surface of the second member 40. Screw holes (not shown) into which the screws 81 are screwed are provided at a plurality of positions on the joint surface 33 of the first member 30 where the gap portions 10a and 10b are not provided.

According to the plasticizing device 100 having such a configuration, a material supplied to the grooves 22 of the screw 20 flows while being plasticized between the screw 20 and the barrel 50 along with the rotation of the screw 20 and by being heated by the rod-shaped heaters 43a, 43b, 43c, and 43d, and the material is guided to the communication hole 35. In other words, the plasticizing device 100 includes the screw 20 serving as a flat screw that has the groove formation surface 21 formed with the grooves 22 and that is rotated about a rotation axis, the barrel 50 that has the facing surface 31 facing the groove formation surface 21 and that is formed with the communication hole 35, and the rod-shaped heaters 43a, 43b, 43c, and 43d serving as heating units that heat the material supplied between the screw 20 and the barrel 50.

Arrangement Pattern of Gap Portions

Figure 8:
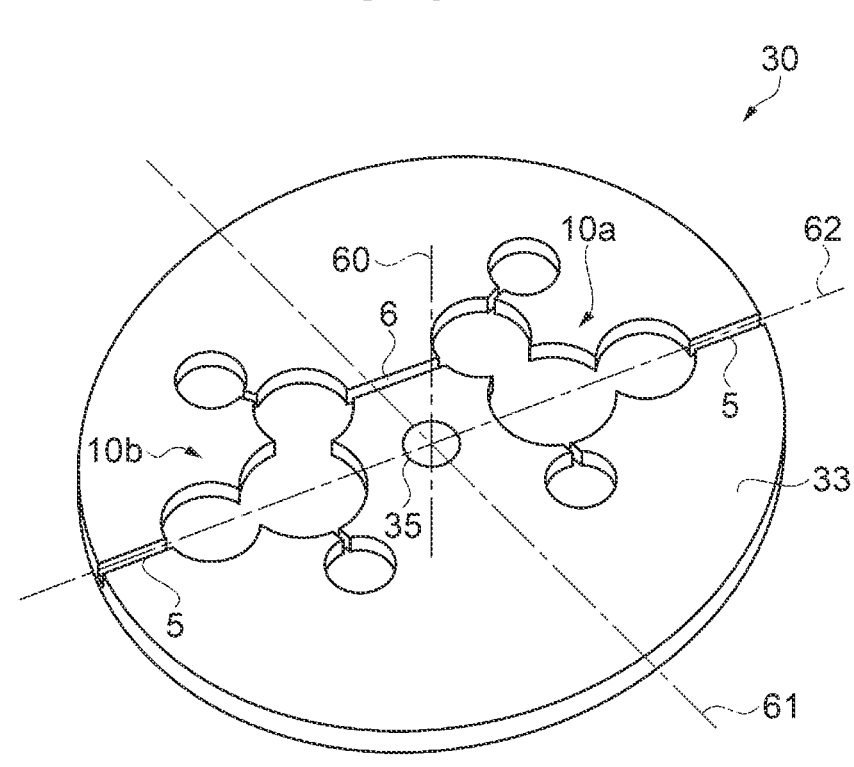
FIG. 8 is a perspective view showing a first member as viewed from a back surface.
Figure 8:
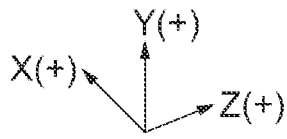
Figure 9:
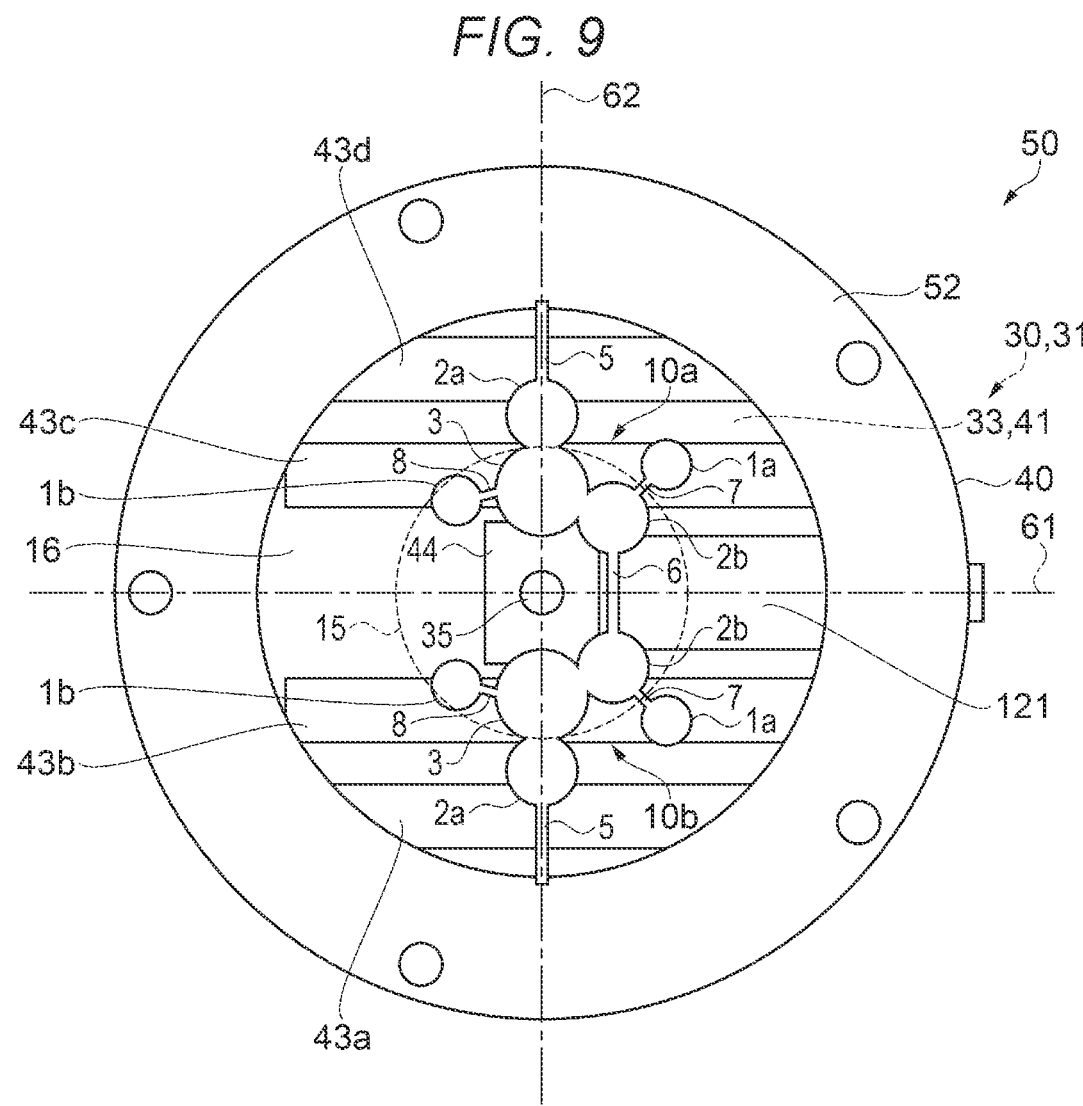
FIG. 9 is a plan view showing an arrangement pattern of gap portions.
Figure 9:
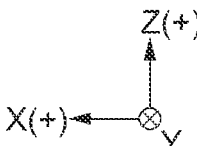

FIG. 8 is a perspective view showing the first member as viewed from a back surface. FIG. 9 is a plan view showing a planar arrangement pattern of gap portions, and corresponds to FIG. 6.

As shown in FIG. 8, the gap portion 10a includes a plurality of circular recessed portions. The same applies to the gap portion 10b. The gap portion 10a and the gap portion 10b have a line-symmetrical shape with a virtual line 61 serving as a symmetry axis, the virtual line 61 is a line that passes through the center of the communication hole 35 and is parallel to the X axis.

FIG. 9 shows an arrangement pattern of the gap portions 10a and 10b, and a shape of the gap portion 10a is superimposed on an internal transparent view of the second member 40 with a solid line.

As shown in FIG. 9, the gap portion 10a is formed by combining circular recessed portions 1, 2, and 3 having different sizes. A diameter of the recessed portion 3 is larger than a thickness of the rod-shaped heater 43c. The recessed portion 3 covers a part of the rod-shaped heater 43c. The center of the recessed portion 3 is provided on a virtual line 62 that passes through the center of the communication hole 35 and is parallel to the Z axis.

A diameter of the recessed portion 2 is smaller than that of the recessed portion 3 and is substantially the same as the thickness of the rod-shaped heater 43c. Two recessed portions 2 are provided, and between the two recessed portions 2, the center of a recessed portion 2a is provided on the virtual line 62. A part of the recessed portion 2a overlaps the rod-shaped heater 43d. A part of the recessed portion 2a overlaps with and is coupled to the recessed portion 3.

A recessed portion 2b overlaps with a joint portion between the tubular portion 44 and the cylinder 121. A part of the recessed portion 2b overlaps with and is coupled to the recessed portion 3.

A diameter of the recessed portion 1 is smaller than that of the recessed portion 2 and is smaller than the thickness of the rod-shaped heater 43c. Two recessed portions 1 are provided, and between the two recessed portions 1, a recessed portion 1a overlaps with the rod-shaped heater 43c in the Z positive direction of the recessed portion 2b. The recessed portion 1a and the recessed portion 2b are coupled by a flow path 7. The flow path 7 is a groove that couples the recessed portion 1a and the recessed portion 2b, and when the first member 30 is attached to the second member 40, the placement surface 41 serves as a lid, and the flow path 7 serves as a hole that couples the recessed portions 1a and the recessed portions 2b.

A recessed portion 1b overlaps with the rod-shaped heater 43c in the X negative direction of the recessed portion 3. The recessed portion 1b is located near a corner of the tubular portion 44. The recessed portion 1b and the recessed portion 3 are coupled by a flow path 8. The flow path 8 is a groove that couples the recessed portion 1b and the recessed portion 3, and when the first member 30 is attached to the second member 40, the placement surface 41 serves as a lid, and the flow path 8 serves as a hole that couples the recessed portions 1b and the recessed portions 3.

A flow path 5 is provided from the recessed portion 2a toward an outer peripheral edge of the first member 30. The flow path 5 is provided along the virtual line 62, and outside air is introduced into the gap portion 10a through the flow path 5. In other words, the barrel 50 is provided with the flow path 5 serving as a hole for communicating the gap portion 10a serving as a space with the outside.

The gap portion 10b is in line-symmetrical to the gap portion 10a with the virtual line 61 serving as a symmetry axis. The gap portion 10b overlaps with the rod-shaped heaters 43a and 43b. The recessed portion 2b of the gap portion 10a and the recessed portion 2b of the gap portion 10b are coupled by a flow path 6. Air can be circulated between the gap portion 10a and the gap portion 10b through the flow path 6. In other words, a plurality of the gap portions 10a and 10b serving as spaces are provided, and the gap portions 10a and 10b communicate with one another through the flow path 6 serving as a hole.

Depths of the recessed portions 1, 2, 3 are about 3 mm in a preferred example. The depth is not limited thereto, and may be 0.5 mm or more and 10 mm or less as along as the depth is a depth at which the recessed portions 1, 2, and 3 function as heat conduction buffer portions. A thickness of the first member 30 in a portion where a recessed portion is formed is about 3 mm in a preferred example. The thickness is not limited thereto, and may be 3 mm or more as along as the thickness is a thickness at which required structural strength can be ensured even when the portion is thinned.

Although the flow paths 5 to 8 are provided as preferred examples in the above description, the disclosure is not limited thereto, and the flow paths 5 to 8 may be omitted. With such a configuration, a function of a heat conduction buffer portion can also be obtained.

In the first member 30 shown in FIG. 9, a circular region having a size that is slightly larger than a size of the tubular portion 44 including the communication hole 35 and at which the circular region covers the rod-shaped heaters 43b and 43c in a portion overlapping with the virtual line 62 is defined as a first region 15, and an annular region outside the first region 15 is defined as a second region 16.

Here, half or more of the gap portion 10a is accommodated in the first region 15. Specifically, among five recessed portions constituting the gap portion 10a, the recessed portion 3, the recessed portion 2b, and the recessed portion 1b are disposed in the first region 15. The same applies to the gap portion 10b. In other words, the first member 30 includes the first region 15 including the communication hole 35 and the second region 16 surrounding the first region 15, and a total volume of the recessed portion 3, the recessed portion 2b, and the recessed portion 1b serving as a sum of volumes of spaces in the first region 15 is larger than a total volume of the recessed portion 2a and the recessed portion 1a serving as a sum of volumes of spaces in the second region 16.

This is to prevent a temperature distribution in a central region of the facing surface 31 of the first member 30 from being distorted by heating from the rod-shaped heaters 43b and 43c that are provided immediately below the facing surface 31, and a proportion of the gap portions 10a and 10b in the first region 15 is made larger than that in the second region 16. When the temperature distribution on the facing surface 31 is distorted, heat may be retained at the center of the facing surface 31 and a plasticized material may be excessively heated.

As shown in FIG. 9, an area of a portion overlapping with the rod-shaped heaters 43c and 43d in the gap portion 10a is set to be larger than an area of a portion not overlapping with the rod-shaped heaters 43c and 43d. Similarly, an area of a portion overlapping with the rod-shaped heaters 43a and 43b in the gap portion 10b is set to be larger than an area of a portion not overlapping with the rod-shaped heaters 43a and 43b. In other words, when viewed along a direction of the center line 60 serving as a rotation axis, a proportion of portions of the gap portions 10a and 10b serving as spaces where the gap portions 10a and 10b overlap with the rod-shaped heaters 43a, 43b, 43c, and 43d is larger than a proportion of portions of the gap portions 10a and 10ba serving as spaces where the gap portions 10a and 10b do not overlap with the rod-shaped heaters 43a, 43b, 43c, and 43d.

Figure 10:
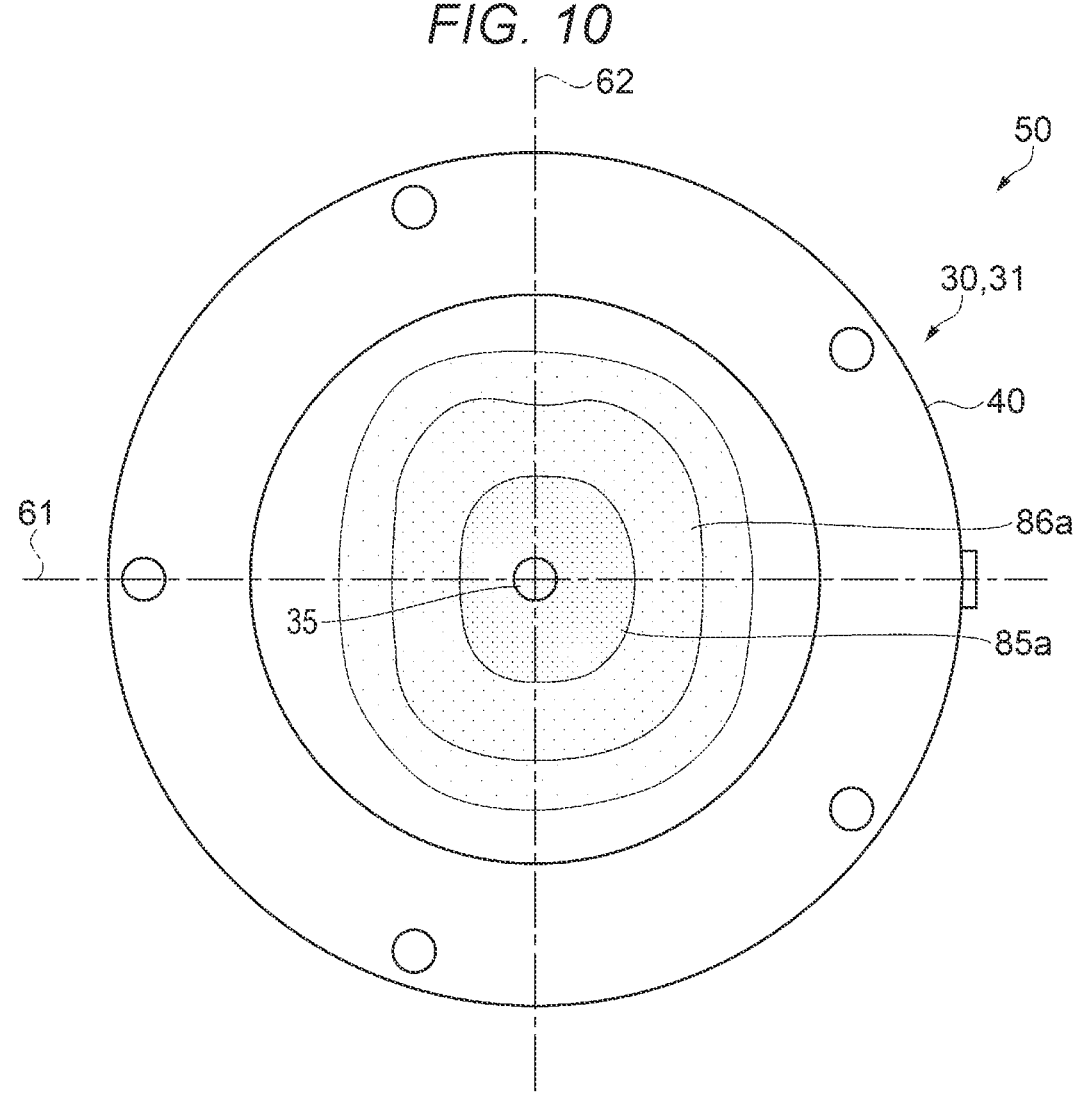
FIG. 10 is a temperature distribution diagram showing a simulation result of a temperature distribution of the barrel.
Figure 11:
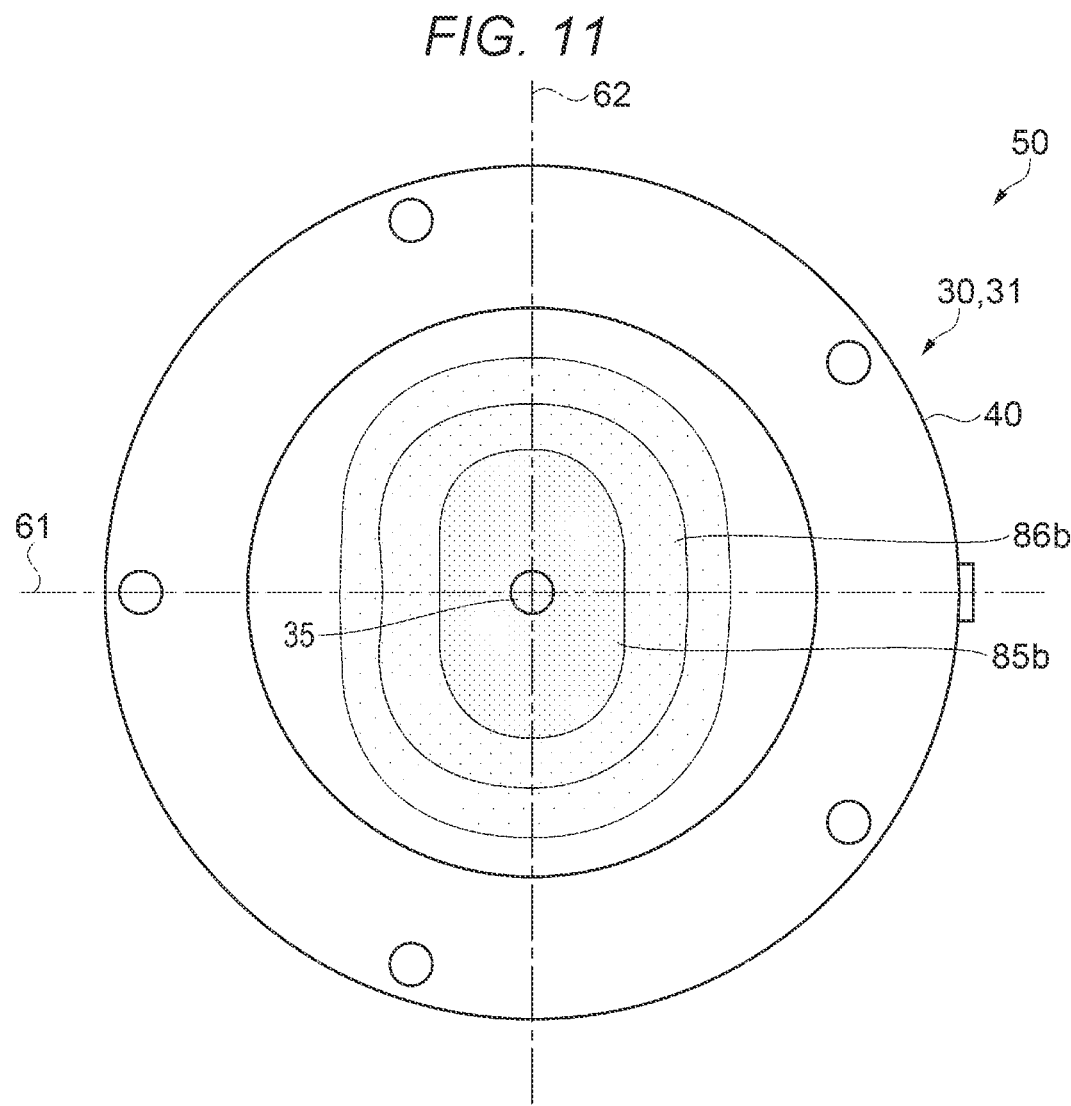
FIG. 11 is a temperature distribution diagram showing a simulation result of a temperature distribution of a barrel in a comparative example.
Figure 11:
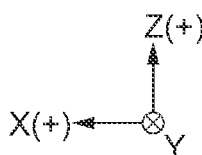

FIG. 10 is a temperature distribution diagram showing a temperature distribution of the barrel according to the embodiment. FIG. 11 is a temperature distribution diagram showing a temperature distribution of a barrel according to a comparative example.

FIG. 10 is a temperature distribution diagram showing a simulation result of a temperature distribution of the barrel according to the embodiment. FIG. 11 is a temperature distribution diagram showing a simulation result of a temperature distribution of the barrel according to the comparative example. "ANSYS 2021 R2" manufactured by ANSYS was used as simulation software.

A temperature distribution on the facing surface 31 of the first member 30 of the barrel 50 is preferably a distribution in which a temperature is reduced in a stepwise manner in a concentric circular shape from a high-temperature portion about the communication hole 35 to the peripheral portion. As shown in FIG. 11, a range surrounded by a line 85b from the communication hole 35 having a highest temperature is a temperature region of 380° C. to 400° C. Here, it is understood that the line 85b has an oval shape that is long in an extending direction of the virtual line 62. It is understood that a line 86b surrounding the line 85b also has a similar oval shape. A range surrounded by the line 86b is a temperature range of 360° C. to 380° C. Such an oval temperature distribution is not preferable, and heat may be retained in the center of the facing surface 31. In particular, in a case where a material having a high plasticization temperature such as PEEK is used, since there is no place to escape heat when a gap portion is not provided as in the comparative example, a plasticized material may be excessively heated. When a barrel is formed of members having different thermal conductivities as in JP-A-2022-83026, since thermal expansion coefficients of the members are different from one another, distortion may occur in the barrel under a high-temperature condition.

FIG. 10 is a temperature distribution diagram of the facing surface 31 of the barrel 50 according to the embodiment using the first member 30 having the gap portions 10a and 10b.

As shown in FIG. 10, it can be seen that a line 85a indicating a temperature range of 380° C. to 400° C. is closer to a circle than the line 85b in FIG. 11, and is substantially concentric with the communication hole 35. Similarly, it can be seen that a line 86a indicating a temperature range of 360° C. to 380° C. is closer to the circle than the line 86b shown in FIG. 11. In this manner, according to the barrel 50 in the embodiment provided with the gap portions 10a and 10b, a temperature distribution on the facing surface 31 of the first member 30 can be a concentric circular temperature distribution about the communication hole 35.

Although it is also conceivable to use an annular ring heater as a method for obtaining a concentric circular temperature distribution, since the ring heater is not commercially available, a cost of the ring heater is high since the ring heater is a special product, and the ring heater has a long delivery time, a technique for obtaining a concentric circular temperature distribution using a rod-shaped heater which has a low cost and can be procured in a short delivery time is required. Since the ring heater uses ceramic at an outer frame, the ring heater may be easily broken as compared with a rod-shaped heater including a metal outer frame, and a yield may be poor.

As described above, according to the plasticizing device 100 and the injection molding device 200 in the embodiment, the following effects can be obtained.

The plasticizing device 100 includes the screw 20 serving as a flat screw that has the groove formation surface 21 formed with the groove 22 and is rotated about a rotation axis, the barrel 50 that has the facing surface 31 facing the groove formation surface 21 and is formed with the communication hole 35, and the rod-shaped heaters 43a, 43b, 43c, and 43d serving as heating units that heat a material supplied between the screw 20 and the barrel 50. The barrel 50 has a separate structure including the first member 30 having the facing surface 31 and the second member 40 separated from the facing surface 31. The gap portions 10a and 10b are provided as spaces between the first member 30 and the second member 40. The rod-shaped heaters 43a, 43b, 43c, and 43d are provided in the second member 40.

Accordingly, the gap portions 10a and 10b function as heat conduction buffer portions by providing the gap portions 10a and 10b in the joint surface 33 of the first member 30, and thus the temperature distribution on the facing surface 31 of the first member 30 can be a concentric circular temperature distribution about the communication hole 35. Therefore, stabilized plasticizing performance can be obtained without causing a problem that heat is retained at the center of the facing surface 31 due to distortion of the temperature distribution and a plasticized material is excessively heated. Further, a concentric circular temperature distribution can be obtained by using a rod-shaped heater which is easily procured at a low cost.

Accordingly, it is possible to provide the plasticizing device 100 having high reliability under a high-temperature condition and stable plasticizing performance.

The barrel 50 is provided with the flow path 5 serving as a hole for communicating the gap portions 10a and 10b serving as spaces with the outside.

Accordingly, air serving as a refrigerant can be circulated in the gap portions 10a and 10b. When the flow path 5 is not provided, air in the gap portions 10a and 10b expands and the barrel 50 is distorted, and when the flow path 5 is provided, such an expansion can be prevented.

A plurality of gap portions 10a and 10b serving as spaces are provided, and the gap portions 10a and 10b communicate with one another through the flow path 6 serving as a hole.

Accordingly, air serving as a refrigerant can be circulated in the gap portions 10a and 10b.

When viewed in a direction orthogonal to the rotation axis, the first member 30 has a convex shape in which a thickness increases from an outer periphery toward the center.

Accordingly, even when the gap portions 10a and 10b are provided at the central portion, a remaining thickness can be sufficiently ensured, and thus structural strength of the first member 30 can be ensured.

The first member 30 includes the first region 15 including the communication hole 35 and the second region 16 surrounding the first region 15, and a total volume of the recessed portion 3, the recessed portion 2b, and the recessed portion 1b serving as a sum of volumes of spaces in the first region 15 is larger than a total volume of the recessed portion 2a and the recessed portion 1a serving as a sum of volumes of spaces in the second region 16.

Accordingly, it is possible to prevent the temperature distribution in the central region of the facing surface 31 of the first member 30 from being distorted by heating from the rod-shaped heaters 43b and 43c that are provided immediately below the facing surface 31.

Heating units include a plurality of rod-shaped heaters 43a, 43b, 43c, and 43d that are disposed symmetrically relative to the communication hole 35 along the facing surface 31, and when viewed along a direction of the center line 60 serving as a rotation axis, a proportion of portions of the gap portions 10a and 10b serving as spaces where the gap portions 10a and 10b overlap with the rod-shaped heaters 43a, 43b, 43c, and 43d is larger than a proportion of portions of the gap portions 10a and 10b serving as spaces where the gap portions 10a and 10b do not overlap with the rod-shaped heaters 43a, 43b, 43c, and 43d.

Accordingly, it is possible to prevent the temperature distribution in the central region of the facing surface 31 of the first member 30 from being distorted by heating from the rod-shaped heaters 43b and 43c that are provided immediately below the facing surface 31.

The injection molding device 200 includes the plasticizing device 100, the nozzle portion 114 that injects a material plasticized by the plasticizing device 100, and the fixed mold support portion 141 and the movable mold support portion 142 that serve as a fixing portion for fixing the mold 160 that receives the material.

Accordingly, it is possible to provide the injection molding device 200 having high reliability under a high-temperature condition and stable plasticizing performance.

Second Embodiment

Different Cooling Mode

Figure 12:
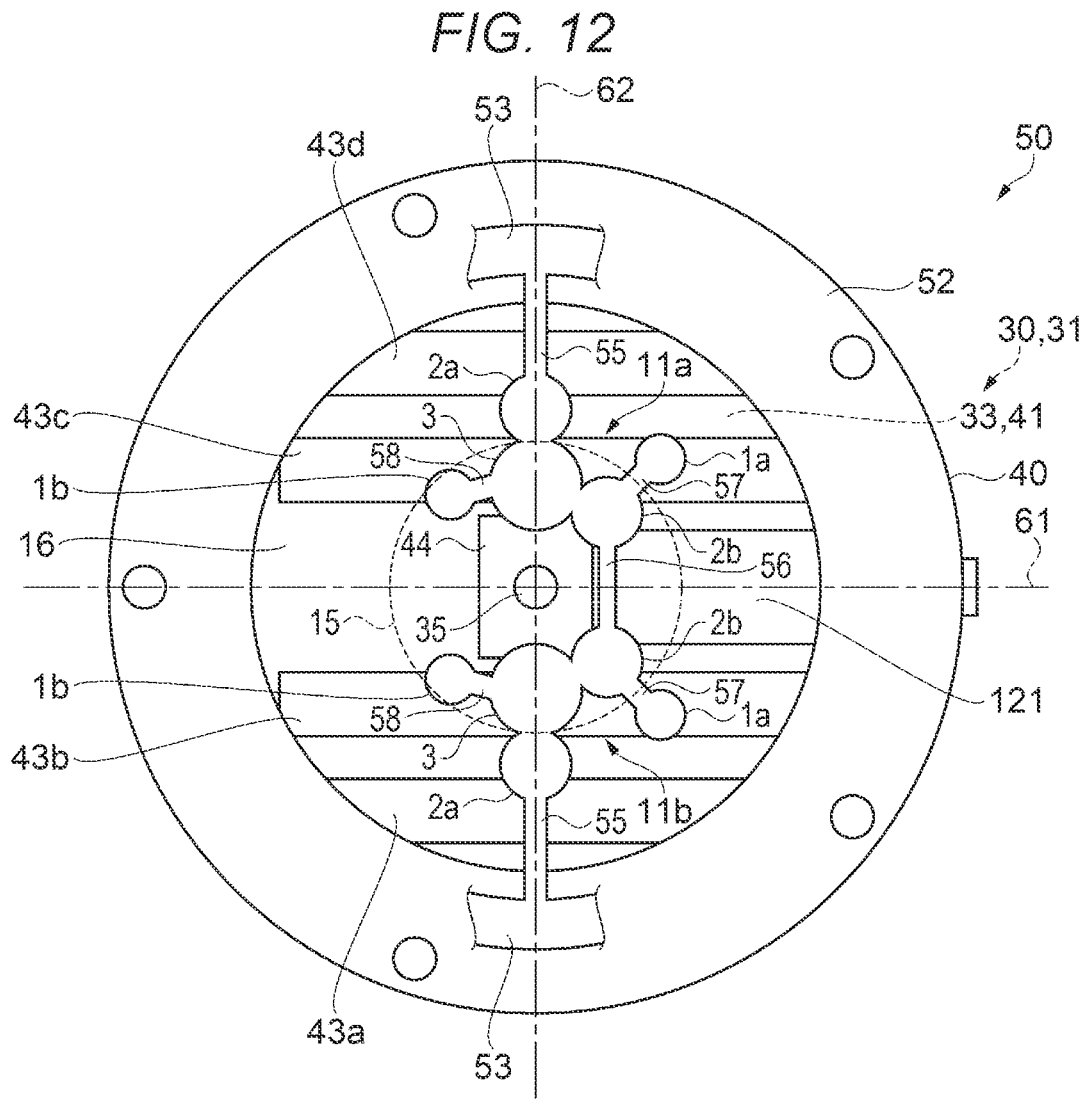
FIG. 12 is a plan view showing an arrangement pattern of gap portions according to a second embodiment.
Figure 12:
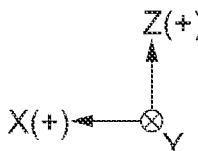

FIG. 12 is a plan view showing an arrangement pattern of gap portions according to a second embodiment, and corresponds to FIG. 9.

Although air is used as a cooling medium in the embodiment described above, the cooling medium is not limited thereto, and a liquid such as water may be used for cooling. Hereinafter, the same members as those in the above embodiment are denoted by the same reference numerals, and repeated description is omitted.

Gap portions 11a and 11b according the embodiment are filled with water, and have a configuration in which water can be circulated in the gap portions 11a and 11b. A cooling medium is not limited to water, and may be any liquid.

Similar to the gap portion 10a, the gap portion 11a includes the recessed portion 1a, the recessed portion 1b, the recessed portion 2a, the recessed portion 2b, and the recessed portion 3. The gap portion 11a is different from the gap portion 10a in that a flow path is thick in order to circulate water and the flow path communicates with the refrigerant pipe 53 of the cooling unit 52.

First, the recessed portion 2a of the gap portion 11a and the refrigerant pipe 53 are coupled by a flow path 55 that is thicker than the flow path 5. The recessed portion 1a and the recessed portion 2b are coupled by a flow path 57 that is thicker than the flow path 7. The recessed portion 1b and the recessed portion 3 are coupled by a flow path 58 that is thicker than the flow path 8. The same applies to the gap portion 11b. The gap portion 11a and the gap portion 11b are coupled by a flow path 56 that is thicker than the flow path 6.

Accordingly, water in the refrigerant pipe 53 flows through the gap portion 11a and the gap portion 11b, and then returns to the refrigerant pipe 53 again. That is, cooling water is circulated in the refrigerant pipe 53, the gap portion 11a, and the gap portion 11b.

In other words, the refrigerant pipe 53 serving as a cooling flow path through which water serving as a cooling medium flows is provided along an outer periphery of the screw 20, and the flow path 55 serving as a hole for communicating the gap portions 11a and 11b serving as spaces with the refrigerant pipe 53 is provided in the barrel 50.

Figure 13:
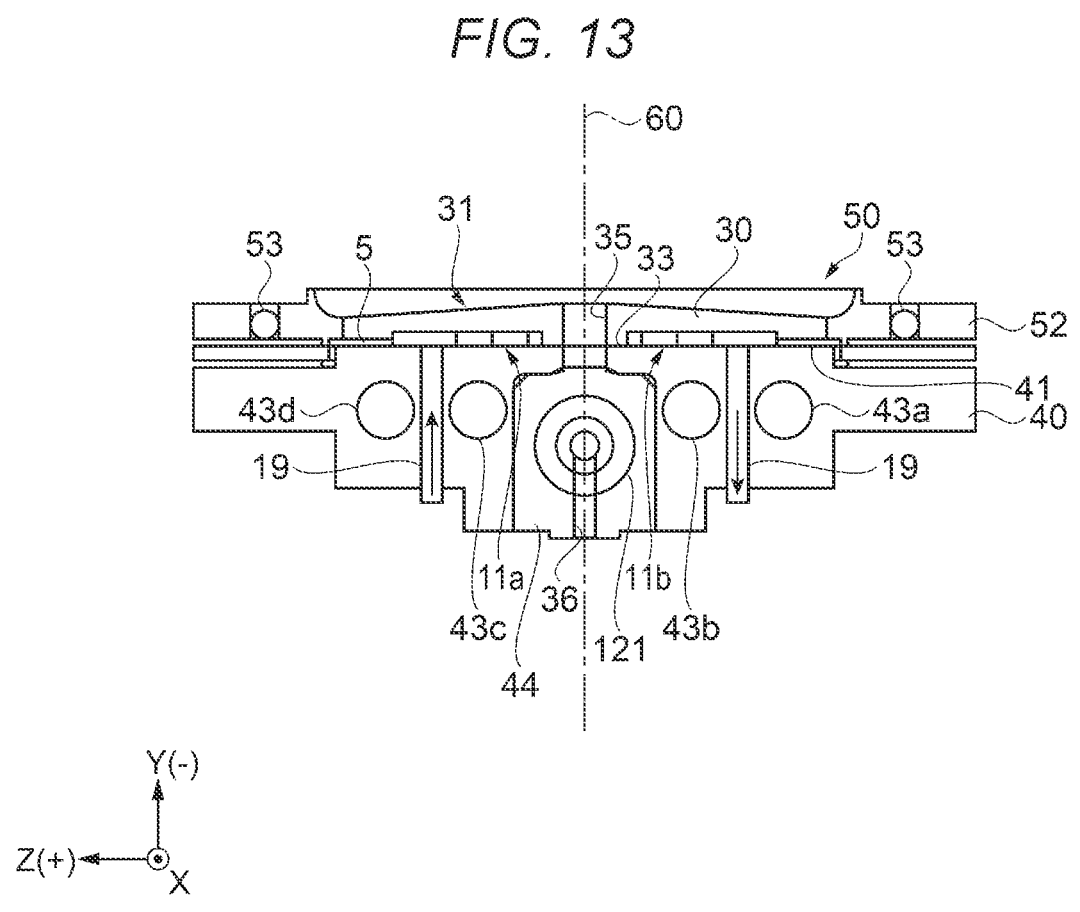

FIG. 13 is a cross-sectional view showing a barrel according to the second embodiment, and corresponds to FIG. 7.

Although cooling water is supplied to the gap portions 11a and 11b from the cooling unit 52 surrounding the first member 30 in FIG. 12, the cooling water may be supplied from the second member 40 side. As shown in FIG. 13, the flow path 55 is not provided in the gap portion 11a. Instead, a flow path 19 is provided in a lower portion of the recessed portion 2a. Similarly, the flow path 19 is provided in the recessed portion 2a of the gap portion 11b.

The flow path 19 is a cooling flow path for supplying cooling water from a cooling water container provided outside the second member 40 on the Y positive side. Water supplied from the flow path 19 flows through the gap portion 11a, the flow path 56 (FIG. 12), and the gap portion 11b, and then returns to a cooling water container (not shown) through the flow path 19.

In such a configuration, the gap portions 11a and 11b also function as heat conduction buffer portions, and thus a temperature distribution on the facing surface 31 of the first member 30 can be a concentric circular temperature distribution about the communication hole 35.

As described above, according to the plasticizing device 100 and the injection molding device 200 in the embodiment, the following effects can be obtained in addition to effects of the above-described embodiment.

In the plasticizing device 100, the refrigerant pipe 53 serving as a cooling flow path through which water serving as a cooling medium flows is provided along an outer periphery of the screw 20, and the flow path 55 serving as a hole for communicating the gap portions 11a and 11b serving as spaces with the refrigerant pipe 53 is provided in the barrel 50.

Accordingly, when a liquid is used as a cooling medium, the gap portions 11a and 11b also function as heat conduction buffer portions, and thus a temperature distribution on the facing surface 31 of the first member 30 can be a concentric circular temperature distribution about the communication hole 35.

Accordingly, it is possible to provide the plasticizing device 100 and the injection molding device 200 having high reliability under a high-temperature condition and stable plasticizing performance.

Third Embodiment

Three-Dimensional Fabrication Device

Figure 14:
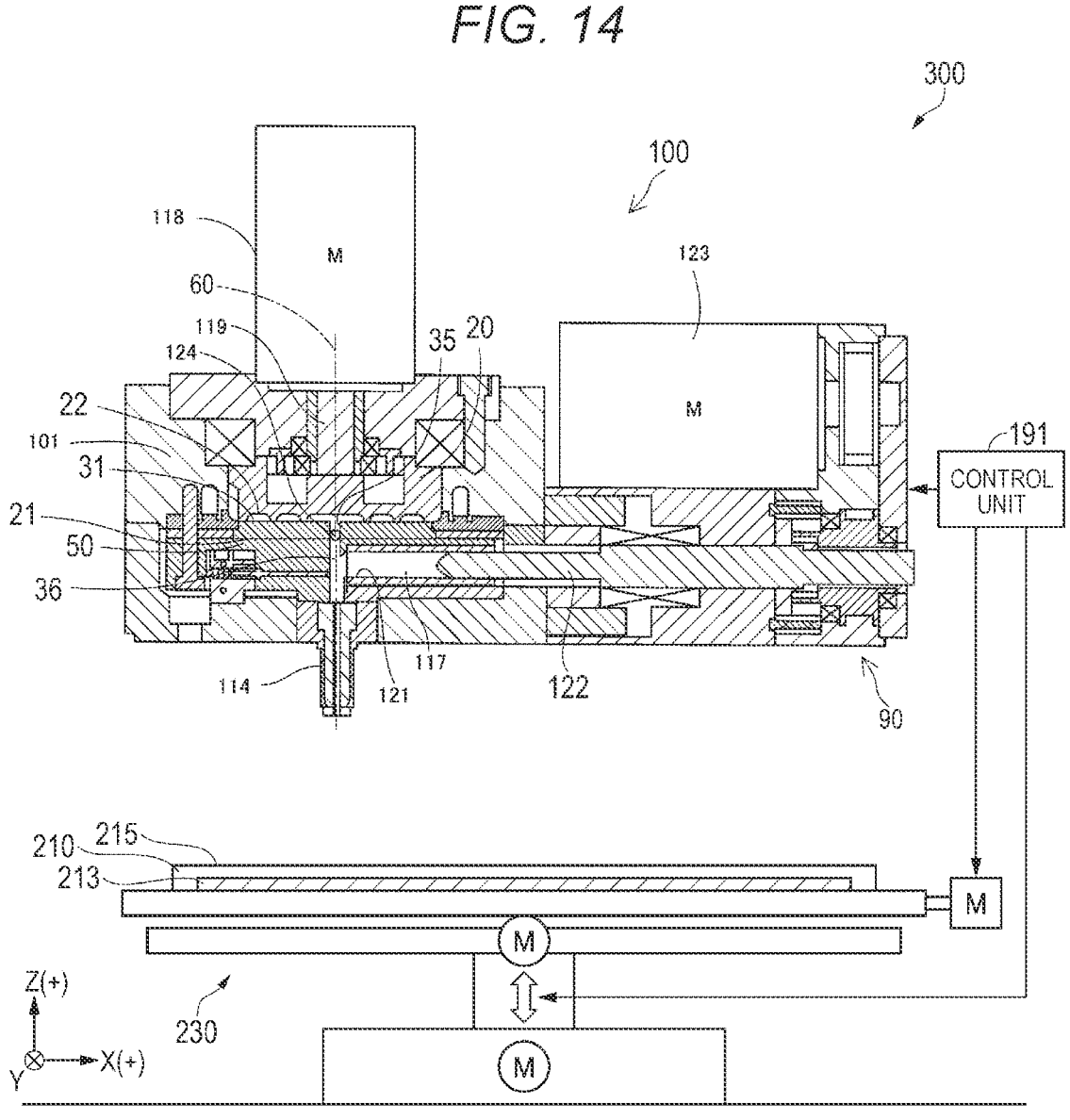
FIG. 14 is a schematic configuration diagram of a three-dimensional fabrication device according to a third embodiment.

FIG. 14 is a schematic configuration diagram showing a three-dimensional fabrication device according to a third embodiment.

The plasticizing device 100 according to the above embodiments can also be applied to a three-dimensional fabrication device.

Hereinafter, the same members as those in the above embodiment are denoted by the same reference numerals, and repeated description is omitted.

A three-dimensional fabrication device 300 according to the embodiment shown in FIG. 14 includes the plasticizing device 100 that generates and extrudes a modeling material made of a plasticized material, a stage 210 having a fabrication surface 215 on which the modeling material is stacked, a position change unit 230 that changes a relative position between the nozzle portion 114 and the stage 210, and a control unit 191 that controls the position change unit 230.

The stage 210 is disposed at a position facing the nozzle portion 114. In the embodiment, the fabrication surface 215 of the stage 210 facing the nozzle portion 114 is disposed in parallel to the X and Y directions, that is, a horizontal direction. At the time of three-dimensional fabrication, the three-dimensional fabrication device 300 fabricates a three-dimensional object by extruding a modeling material from a tip end of the nozzle portion 114 toward the fabrication surface 215 of the stage 210 and stacking layers.

The stage 210 includes a stage heater 213 serving as a heating unit. The stage heater 213 prevents a rapid decrease in a temperature of the modeling material extruded onto the stage 210.

The position change unit 230 changes a relative position between the nozzle portion 114 and the stage 210. In the embodiment, a position of the nozzle portion 114 is fixed, and the position change unit 230 moves the stage 210. The position change unit 230 is implemented by a three-axis positioner that moves the stage 210 in three axial directions of X, Y, and Z directions by drive forces of three motors. The position change unit 230 changes a relative positional relationship between the nozzle portion 114 and the stage 210 under the control of the control unit 191. The movement of the nozzle portion 114 refers to move the nozzle portion 114 relative to the stage 210.

In other words, the three-dimensional fabrication device 300 includes the plasticizing device 100, the nozzle portion 114 that extrudes a material plasticized by the plasticizing device 100, and the stage 210 having the fabrication surface 215 on which the material is stacked.

Instead of a configuration in which the position change unit 230 moves the stage 210, the position change unit 230 may move the nozzle portion 114 relative to the stage 210 in a state in which a position of the stage 210 is fixed.

A configuration in which the position change unit 230 moves the stage 210 in the Z direction and moves the nozzle portion 114 in the X and Y directions or a configuration in which the position change unit 230 moves the stage 210 in the X and Y directions and moves the nozzle portion 114 in the Z direction may be adopted. With such configurations, the relative positional relationship between the nozzle portion 114 and the stage 210 can also be changed.

As described above, according to the three-dimensional fabrication device 300 in the embodiment, the following effects can be obtained.

The three-dimensional fabrication device 300 includes the plasticizing device 100, the nozzle portion 114 that extrudes a material plasticized by the plasticizing device 100, and the stage 210 having the fabrication surface 215 on which the material is stacked.

Accordingly, since the three-dimensional fabrication device 300 includes the plasticizing device 100, it is possible to efficiently perform 3D fabrication using a material in a uniform plasticized state which is stably supplied.

Therefore, it is possible to provide the three-dimensional fabrication device 300 having high reliability under a high-temperature condition and stable plasticizing performance.

Modifications

Different Arrangement Pattern of Gap Portions

Figure 15:
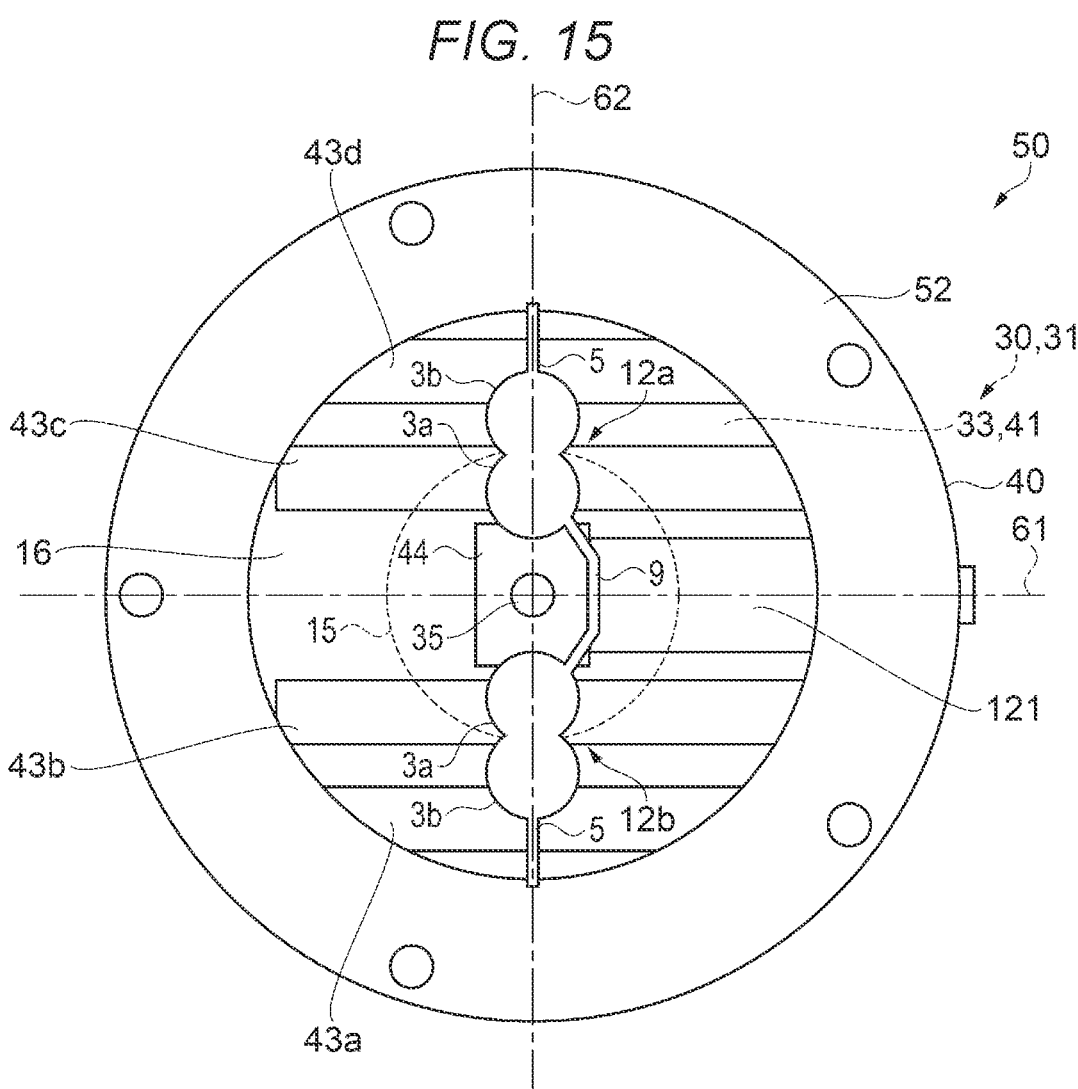
FIG. 15 is a plan view showing an arrangement pattern of gap portions according to a modification.
Figure 16:
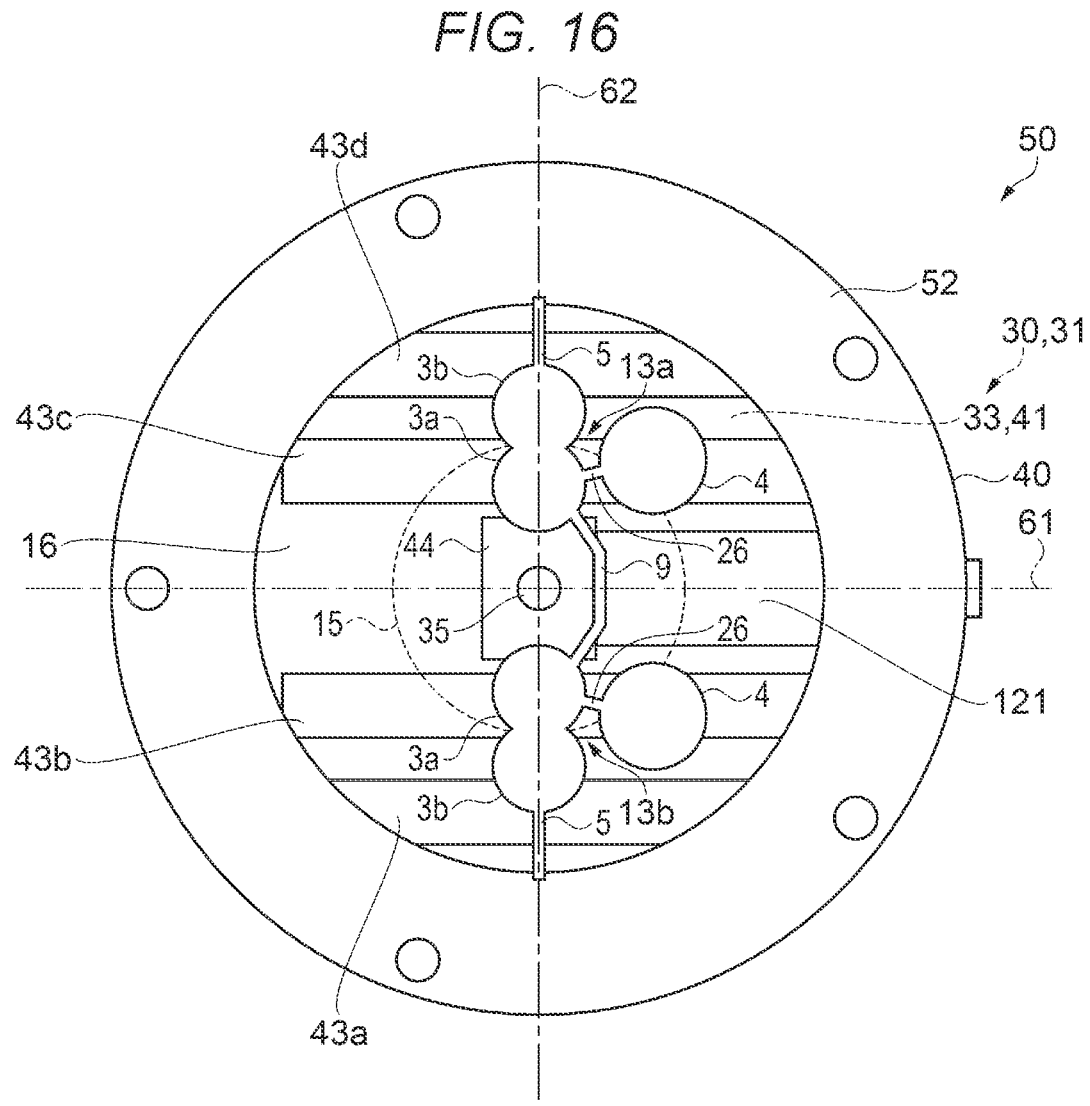
FIG. 16 is a plan view showing a different arrangement pattern of gap portions according to a modification.
Figure 16:
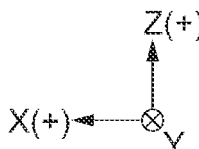

FIG. 15 is a plan view showing a planar arrangement pattern of gap portions according to a modification, and corresponds to FIG. 9. FIG. 16 is a plan view showing a different planar arrangement pattern of gap portions according to a modification, and corresponds to FIG. 15.

Although the gap portion 10*a* having a configuration in which five recessed portions are combined is described as an example of gap portions in the above embodiments, an arrangement pattern of gap portions is not limited thereto, and any arrangement pattern may be used as along as the gap portions can function as heat conduction buffer portions. Hereinafter, the same members as those in the above embodiments are denoted by the same reference numerals, and repeated description is omitted.

A gap portion 12*a* shown in FIG. 15 includes two recessed portions 3*a* and 3*b*. The recessed portions 3*a* and 3*b* are provided on the virtual line 62. The recessed portion 3*a* is provided on the communication hole 35 side, and covers a part of the rod-shaped heater 43*c*. The recessed portion 3*b* is provided on a peripheral edge portion side of the first member 30, and a part of the recessed portion 3*b* overlaps with and is coupled to the recessed portion 3*a*. A part of the recessed portion 3*b* covers a part of the rod-shaped heater 43*d*. The flow path 5 is provided from the recessed portion 3*b* toward an outer peripheral edge of the first member 30. The flow path 5 is provided along the virtual line 62, and outside air is introduced into the gap portion 12*a* through the flow path 5. The same applies to the gap portion 12*b*. The gap portion 12*a* and the gap portion 12*b* are in line-symmetrical with the virtual line 61 serving as a symmetry axis. The gap portion 12*a* and the gap portion 12*b* communicate with each other through a flow path 9.

A gap portion 13*a* shown in FIG. 16 has a recessed portion 4 in addition to the configuration of the gap portion 12*a*. A diameter of the recessed portion 4 is larger than that of the recessed portion 3*a*. The recessed portion 4 covers a part of the rod-shaped heater 43*c* in the X positive direction of the recessed portion 3*a*. The recessed portion 4 and the recessed portion 3*a* are coupled to each other by a flow path 26. The same applies to the gap portion 13*b*.

According to a verification result of the inventors, it is confirmed that a concentric circular temperature distribution is also obtained in the arrangement pattern of the gap portions 12*a* and 12*b* and the gap portions 13*a* and 13*b*, as compared with a temperature distribution according to the comparative example shown in FIG. 11. For example, an arrangement pattern of gap portions for obtaining a concentric circular temperature distribution may be obtained by a simulation using a topology optimization method.

What is claimed is:

1. A plasticizing device comprising:
   a flat screw that has a groove formation surface formed with a groove and is rotated about a rotation axis;
   a barrel that has a facing surface facing the groove formation surface and is formed with a communication hole; and
   a heating unit configured to heat a material supplied between the flat screw and the barrel, wherein the barrel has a separate structure including a first member having the facing surface and a second member separated from the facing surface, a space is defined between the first member and the second member, the heating unit is disposed in the second member, a cooling flow path through which a cooling medium flows is formed along an outer periphery of the flat screw, and the barrel is provided with a hole through which the cooling flow path communicates with the space.

2. The plasticizing device according to claim 1, wherein the barrel is provided with a hole through which the space communicates with outside.

3. The plasticizing device according to claim 1, wherein a plurality of the spaces are defined, and the plurality of spaces communicate with one another through a hole.

4. The plasticizing device according to claim 1, wherein the first member has a convex shape in which a thickness increases from an outer periphery toward a center when viewed from a direction orthogonal to the rotation axis.

5. The plasticizing device according to claim 1, wherein the first member has a first region including the communication hole and a second region surrounding the first region, and a sum of volumes of the space in the first region is larger than a sum of volumes of the space in the second region.

6. The plasticizing device according to claim 1, wherein the heating unit includes a plurality of rod-shaped heaters disposed symmetrically relative to the communication hole along the facing surface, and a proportion of portions of the space overlapping with the rod-shaped heaters is larger than a proportion of portions of the space not overlapping with the rod-shaped heaters when viewed along a direction of the rotation axis.

* * * * *